(12) United States Patent
Bar-Haim et al.

(10) Patent No.: US 8,936,896 B2
(45) Date of Patent: Jan. 20, 2015

(54) LIQUID ELECTROPHOTOGRAPHIC INK

(75) Inventors: Gil Bar-Haim, Holon (IL); Gregory Katz, Holon (IL); Anatoly Sobolevsky, Ashdod (IL); Ilanit Mor, Kiryat Ono (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 92 days.

(21) Appl. No.: 13/882,307

(22) PCT Filed: Dec. 16, 2010

(86) PCT No.: PCT/US2010/060838
§ 371 (c)(1),
(2), (4) Date: Apr. 29, 2013

(87) PCT Pub. No.: WO2012/082129
PCT Pub. Date: Jun. 21, 2012

(65) Prior Publication Data
US 2013/0224649 A1    Aug. 29, 2013

(51) Int. Cl.
*G03G 9/08* (2006.01)
*G03G 15/00* (2006.01)
*G03G 9/12* (2006.01)
*G03G 9/135* (2006.01)

(52) U.S. Cl.
CPC .............. *G03G 15/556* (2013.01); *G03G 9/12* (2013.01); *G03G 9/135* (2013.01); *G03G 9/1355* (2013.01)
USPC ....................................................... 430/115

(58) Field of Classification Search
CPC .................................................... G03G 9/135
USPC ........................................................ 430/115
See application file for complete search history.

(56) References Cited

U.S. PATENT DOCUMENTS

| | | | |
|---|---|---|---|
| 4,206,064 A | 6/1980 | Kiuchi et al. | |
| 5,077,170 A | 12/1991 | Tsujihiro | |
| 5,302,482 A | 4/1994 | Elmasry et al. | |
| 6,255,363 B1 | 7/2001 | Baker et al. | |
| 6,512,909 B2 | 1/2003 | Ozawa et al. | |
| 6,537,716 B1 | 3/2003 | Doi et al. | |
| 2004/0185361 A1 | 9/2004 | Yoshino et al. | |
| 2005/0075417 A1 | 4/2005 | Yon et al. | |
| 2005/0160938 A1 | 7/2005 | Moudry et al. | |
| 2006/0029877 A1 | 2/2006 | Sun et al. | |
| 2008/0138728 A1 | 6/2008 | Sugino et al. | |
| 2008/0182196 A1 | 7/2008 | Ron et al. | |

FOREIGN PATENT DOCUMENTS

| | | |
|---|---|---|
| CN | 1281166 | 1/2001 |
| CN | 101473275 | 7/2009 |
| EP | 2017676 | 1/2009 |
| WO | WO-2010053480 | 5/2010 |

OTHER PUBLICATIONS

International Search Report and Written Opinion for PCT/US2010/060838 dated Sep. 29, 2011 (8 pages).

*Primary Examiner* — Mark A Chapman

(57) ABSTRACT

The present disclosure provides for liquid electrophotographic inks having charge stabilizers and associated methods. In one example, a liquid electrophotographic ink can comprise a carrier liquid, a resin, a pigment, a negative charge director, and a charge stabilizer having a reduction potential of 0.16 v to 3.0 v.

15 Claims, No Drawings

LIQUID ELECTROPHOTOGRAPHIC INK

BACKGROUND

Digital printing involves technologies in which a printed image is created directly from digital data, for example using electronic layout and/or desktop publishing programs. Known methods of digital printing include full-color ink-jet, electrophotographic printing, laser photo printing, and thermal transfer printing methods.

Electrophotographic printing techniques involve the formation of a latent image on a photoconductor surface mounted on an imaging plate. The photoconductor is first sensitized to light, usually by charging with a corona discharge, and then exposed to light projected through a positive film of the document to be reproduced, resulting in dissipation of the charge in the areas exposed to light. The latent image is subsequently developed into a full image by the attraction of oppositely charged toner particles to the charge remaining on the unexposed areas. The developed image is transferred from the photoconductor to a rubber offset blanket, from which it is transferred to a substrate, such as paper, plastic or other suitable material, by heat or pressure or a combination of both to produce the printed final image.

The latent image is developed using either a dry toner (a colorant mixed with a powder carrier) or a liquid ink (a suspension of a colorant in a liquid carrier). The toner or ink generally adheres to the substrate surface with little penetration into the substrate. The quality of the final image is largely related to the size of the particles, with higher resolution provided by smaller particles. Dry toners used in solid electrophotography are fine powders with a relatively narrow particle size distribution that are expelled from fine apertures in an application device. Liquid inks used in liquid electrophotography are generally comprised of pigment- or dye-based thermoplastic resin particles suspended in a non-conducting liquid carrier, generally a saturated hydrocarbon.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "carrier liquid" or "liquid vehicle" refers to the fluid in which the pigmented resin of the present disclosure can be dispersed to form an ink dispersion. Such a carrier liquid can be formulated for electrophotographic printing so that the electrophotographic ink has a viscosity and conductivity for such printing, and may include a mixture of a variety of different agents, including without limitation, surfactants, organic solvents and co-solvents, charge control agents, viscosity modifiers, sequestering agents, stabilizing agents, and anti-kogation agents. Though not part of the electrophotographic liquid vehicle per se, in addition to the pigment, the liquid vehicle can include a dispersant for the pigment and can further carry solid additives such as resins, latexes, UV curable materials, plasticizers, salts, charge control agents, etc.

As used herein, "co-solvent" refers to any solvent, including organic solvents, present in the electrophotographic liquid vehicle.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific example, however, the pigment is a pigment colorant.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" refers to nitrogen, oxygen, halogens, phosphorus, or sulfur.

As used herein, "alkyl" refers to a branched, unbranched, or cyclic saturated hydrocarbon group, which typically, although not necessarily, contains from 1 to about 50 carbon atoms, or 1 to about 40 carbon atoms, or 1 to about 30 carbon atoms, for example. Likewise, the term "aryl" refers to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "substantially" or "substantial" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. In the context of optical density (OD) loss, "substantial prevention" or "substantially prevented" refers to a liquid electrophotographic ink that maintains an optical density of the liquid electrophotographic ink during continuous printing over a 10,000 impression run, where maintaining is accomplished by having no optical density loss between a first and $10,000^{th}$ impression. Notably, the present definition does not require that absolutely no optical density loss occur or that the optical density cannot fluctuate between the first impression and the $10,000^{th}$ impression or other impressions there between; rather, that the $10,000^{th}$ impression has optical density within the specifications of the first impression. For example, the set point for an optical density of a cyan ink can be 1.45±0.05; therefore, in this operating window, the fluctuation can be up to 0.1.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that a liquid electrophotographic (LEP) ink having a pigment can be stabilized by the inclusion of a charge stabilizer in the liquid electrophotographic ink. Specifically, it has been discovered that during continuous printing conditions, liquid electrophotographic inks comprising certain pigments, such as some cyan pigments, with negative charge directors (NCD), a loss in optical density (OD) can occur. In accordance with this, liquid electrophotographic inks and associated methods of the present disclosure can be used to prevent or reduce optical density loss during continuous printing compared to liquid electrophotographic inks manufactured by more traditional techniques. More specifically, the liquid electrophotographic inks of the present disclosure can provide an acceptable viscosities and conductivity for electrophotographic printing in addition to providing durable printed images.

Thus, the present disclosure is drawn to liquid electrophotographic ink compositions and methods. That being understood, it is noted that when discussing the present compositions and associated methods, each of these discussions can be considered applicable to each of these examples, whether or not they are explicitly discussed in the context of that example. For example, in discussing a carrier liquid for use in a liquid electrophotographic ink, such a carrier liquid can also be used for a method of making the metallic liquid electrophotographic ink or a method of maintaining optical density of a liquid electrophotographic ink, and vice versa.

With this in mind, a liquid electrophotographic ink can comprise a carrier liquid, a resin, a pigment, a negative charge director, and a charge stabilizer having a reduction potential of 0.16 v to 3.0 v. Additionally, the charge stabilizer can be present at a concentration which stabilizes the liquid electrophotographic ink during continuous printing by removing excess charge from the pigment. In one example, the pigment can be a cyan pigment.

Additionally, a method of maintaining optical density of a liquid electrophotographic ink after 10,000 impressions can comprise adding a charge stabilizer to a liquid electrophotographic ink, such as those described herein, where the charge stabilizer maintains the optical density of the liquid electrophotographic ink. The optical density can be measured as discussed herein.

Generally, the liquid electrophotographic inks disclosed herein can prevent or reduce optical density loss of liquid electrophotographic inks through the inclusion of a charge stabilizer. Without being bound by any particular theory, the present inks and associated methods can stabilize residual charges on the pigment from continuous printing by addition of a charge stabilizer, where the charge stabilizer can absorb/attract and release the excess charges. Specific data showing this relationship is provided in the Examples below. Notably, it has been recognized that the phenomenon of decrease in optical density during continuous printing is more pronounced at printing coverages of 40% and below, and can be even more significantly pronounced below 10%. As such, the present liquid electrophotographic inks and associated methods discussed herein can prevent or reduce optical density loss for these print coverages as well as print coverages outside these ranges.

Generally, the charge director can be a negative charge director (NCD), and in one example, the NCD can comprise a mixture of charging components. In another example, the NCD can comprise at least one of the following: zwitterionic material, such as soya lecithin; basic barium petronate (BBP); calcium petronate; isopropyl amine dodecylebenzene sulfonic acid; etc. In one specific non-limiting example, the NCD can comprise soya lecithin at 6.6% w/w, BBP at 9.8% w/w, isopropyl amine dodecylebenzene sulfonic acid at 3.6% w/w and about 80% w/w isoparaffin (Isopar®-L from Exxon). Additionally, the NCD can comprise any ionic surfactant and/or electron carrier dissolved material.

As described generally, the present compositions and methods are directed towards pigmented liquid electrophotographic inks. As such, the pigments can be organic pigments of any color. In one aspect, the pigments can include phthalocyanin and/or azo pigments. In another aspect, the pigment can include biological chromophores. Additionally, the pigments can include inorganic pigments. In one aspect, the pigments can include metal, metal salts, metal compounds such as metal oxides, and coordinate complexes including their hydrates. Additionally, in one example, the pigments can include aryl groups. In another example, the pigments can include olefinic groups and/or systems. The pigment can be present in the liquid electrophotographic ink from about 0.01 wt % to about 60 wt % of solids. In still another example, the pigment can be present from about 0.1 wt % to about 40 wt % of the solids of liquid electrophotographic ink.

The present liquid electrophotographic ink compositions generally also comprise a charge stabilizer. Typically, the charge stabilizer can be a metal salt or metal complex. The charge stabilizer is generally present in an amount sufficient to interact with the excess charge in the ink as well as have a reduction potential sufficient to absorb the excess charge. The charge stabilizer can be present in the liquid electrophotographic ink in a charge stabilizer to pigment ratio of 1:3 to 1:8 by weight. Additionally, the charge stabilizer can have a reduction potential of, but not limited to, 0.16 v to 3.0 v, and in one example, 0.5 v to 2.0 v. The charge stabilizer can include, without limitation, cobalt(III) acetyl acetonate, iron (III) phthalocyanin chloride, silver benzoate, hexamine cobalt(III) chloride, tris(ethylene diamine) cobalt(III) nitrate, praseodymium(III,IV)oxide, iron(III)ferrocyanide, terbium (III) acetate, pentaamine cobalt(III) chloride, and mixtures thereof. In one specific aspect, the charge stabilizer can be cobalt(III) acetyl acetonate.

Generally, the metallic liquid electrophotographic ink can include an aliphatic solvent including substituted or unsubstituted, linear or branched, aliphatic compounds. Additionally, such solvents can include aryl substituents. In one example, the aliphatic solvent can be substantially nonaqueous, i.e. containing less than 0.5% water. In another example, the aliphatic solvent can be nonaqueous. The aliphatic solvent can comprise a member selected from the group of paraffins, isoparaffins, oils, alkanes having from about 6 to about 100 carbon atoms, and mixtures thereof.

The liquid electrophotographic ink can also include an aliphatic hydrocarbon, such as a paraffin and/or isoparaffin. As such, the aliphatic solvent, or carrier liquid can comprise, or substantially comprise, or even consist essentially of isoparaffins, such as or equivalent to the ISOPAR® high-purity isoparaffinic solvents with narrow boiling ranges marketed by Exxon Mobil Corporation (Fairfax, Va., USA). Also suitable as an aliphatic solvent or cosolvent, for implementing examples of the present invention are alkanes having from about 6 to about 14 carbon atoms such as solvents sold under the NORPAR® (NORPAR® 12, 13 and 15) tradename available from Exxon Mobil Corporation (Fairfax, Va., USA). Other hydrocarbons for use as an aliphatic solvent, or cosolvent, are sold under the AMSCO® (AMSCO® 460 and OMS) tradename available from American Mineral Spirits Company (New York, N.Y., USA), under the SOLTROL® tradename available from Chevron Phillips Chemical Company LLC (The Woodlands, Tex., USA) and under the SHELLSOL® tradename available from Shell Chemicals Limited (London, UK). Such an aliphatic solvent, or cosolvent, can have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, low surface tension, low latent heat of vaporization and low photochemical reactivity.

Generally, the liquid electrophotographic inks can have a conductivity of less than about 300 pS/cm. In one example, the metallic liquid electrophotographic inks can have a conductivity of less than about 200 pS/cm, or in another example, even less than about 100 pS/cm.

As discussed herein, the charge stabilizer can maintain an optical density of the liquid electrophotographic ink. The optical density can be measured at a first impression and after a 10,000$^{th}$ impression where the optical density after the 10,000$^{th}$ impression is within at least 70% of the first impression, and where the printing is performed at 40% coverage over a print media sheet. In another example, the optical density can be within at least 90% of the first impression. In yet another example, the optical density can be within at least 99% of the first impression. In still another example, the loss of optical density can be substantially prevented. In addition to the above optical density measurements, in one example, the printing can be performed at 10% coverage over a print media sheet. Additionally, the printing can be performed at 1% coverage over a print media sheet. Further, the printing can be performed at 0.1% coverage over a print media sheet.

Generally, the liquid electrophotographic inks described herein can include a resin. The resin can be polymerized from monomers selected from the group of ethylene acrylic acid, ethylene methacrylic acid, ethylene acrylic ester maleic anhydride, ethylene acrylic ester glycidyl methacrylate, maleic anhydride, styrene maleic anhydride, and mixtures thereof. The resin can encapsulate the pigment during grinding or mixing to create an ink particle. The ink particle can have a final particle size from about 1 micron to about 10 microns and produce a printed image at thickness of about 1 micron per separation. The resin encapsulated pigments can be formulated to provide a specific melting point. In one example, the melting point can be from about 30° C. to about 150° C. In another example, the melting point can be from about 50° C. to about 100° C. Such melting points can allow for desired film formation during printing.

The liquid electrophotographic ink compositions of the present disclosure can also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof.

In another example, a method of manufacturing a liquid electrophotographic ink can comprise grinding a carrier liquid, a cyan pigment, a resin, a charge director, and a charge stabilizer to form the liquid electrophotographic ink, where the charge stabilizer stabilizes the liquid electrophotographic ink during continuous printing by removing excess charge from the cyan pigment. The removal of the excess charge can be quantified in terms of optical density, as discussed herein.

In the present method, the grinding can be performed from 1 hour to 20 hours. In one example, the grinding can be performed less than 10 hours. Additionally, the grinding can be performed at less than 1000 rpm. The grinding can also be performed at a temperature from 20° C. to 60° C. In one example, the temperature can be from 25° C. to 50° C.

Additionally, this method can include modifying the amounts of pigment needed if the charge stabilizer adds color to the liquid electrophotographic ink. Further, such color correction can be made during printing using half tone procedures or an empirical color testing to target the desired color or using appropriate correction algorithm to adjust the ratio between main and secondary pigment. Another method of color correction can be to correct the color online when mixing with another color at appropriate amount given by algorithm to achieve the desired hue.

EXAMPLES

The following examples illustrate a number of variations of the present compositions and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present compositions and methods have been described above with particularity, the following examples provide further detail in connection with what are presently deemed to be acceptable.

Example 1

Preparation of Liquid Electrophotographic Ink w/ Cobalt(III) Acetyl Acetonate (CoA) (Approx 4% Solids by Weight)

An ethylene-meta acrylic acid copolymer resin (Nucrel® 699 by DuPont™ Co.), an ethylene acrylic acid copolymer (AC5120 by Honeywell Co.) and isoparaffin (Isopar LC® by Exxon Mobile Corp.) was mixed in a double planetary mixer at a temperature of approximately 125° C. in a ratio of Nucrel®699 to AC5120 of 80:20 w/w, respectively. The resulting paste was diluted with Isopar LC® to obtain a total resin of 25% w/w. This paste was combined with copper(II) phthalocyanine blue pigment with color index of 15:3 (provided by TOYO company) 12.1% w/w of ink solids, polychloro copper(II) phthalocyanine green pigment (provided by BASF company) 0.9% w/w of ink solids, Aluminum(III) stearate/palmitate salt, polyethylene oxide wax, silica powder, Isopar L®, and cobalt(III) acetyl acetonate (CoA) (from Sigma Aldrich Co.) in the amounts listed in Table 1 in a attritor. The mixture was grinded for 1.5 hours at 52° C. (hot stage) followed by 10.5 hours at 40° C. (cold stage) at 250 rpm to obtain the liquid electrophotographic ink. The wax was added with a solids amount per the percent solids of the ink and therefore does not change the percent solids.

TABLE 1

| Component | Weight (g) | Solids (g) | % solids by weight | % ink solids by weight |
|---|---|---|---|---|
| Resin Paste | 1503.3 | 375.8 | 25.0 | 78.4 |
| Copper(II) phthalocyanine blue pigment | 59.2 | 59.2 | 100 | 12.4 |
| Polychloro Copper(II) phthalocyanine green pigment | 4.40 | 4.4 | 100 | 0.9 |
| Aluminum(III) stearate/palmitate salt | 10.8 | 10.8 | 100 | 2.3 |
| silica powder | 9.8 | 9.8 | 100 | 2.0 |
| Cobalt(III) acetyl acetonate | 18.4 | 18.4 | 100 | 3.8 |
| Isopar L ® | 712.5 | 0 | 0 | 0 |
| Total (w/o wax) | 2318.4 | 478.4 | 20.6 | 99.8 |
| polyethylene oxide wax | 4.2 | 0.87 | 20.6 | 0.2 |
| Total (w/wax) | 2322.6 | 479.2 | 20.6 | 100 |

Example 2

Preparation of Reference Liquid Electrophotographic Ink

The reference ink was prepared with the components, the specific amounts, and under the specific conditions of Example 1, except cobalt(III) acetyl acetonate, which was not added.

Example 3

Preparation of Liquid Electrophotographic Ink w/ Cobalt(III) Acetyl Acetonate (CoA) (1% Solids by Weight)

The liquid electrophotographic ink was prepared with the components, the specific amounts, and under the specific conditions of Example 1, except that cobalt(III) acetyl acetonate was added in an amount to provide 1 wt % solids by weight.

Example 4

Preparation of Liquid Electrophotographic Ink w/ Ag Benzoate (4% Solids by Weight)

The liquid electrophotographic ink was prepared with the components, the specific amounts, and under the specific conditions of Example 1, except that cobalt(III) acetyl acetonate was replaced with silver benzoate (Ag benzoate) at an amount to provide 4% solids by weight.

Example 5

Preparation of Liquid Electrophotographic Ink w/ Fe(III) Phthalocyanin Chloride (4% Solids by Weight)

The liquid electrophotographic ink was prepared with the components, the specific amounts, and under the specific conditions of Example 1, except that cobalt(III) acetyl acetonate was replaced with iron(III) phthalocyanin chloride (Fe (III) phthalocyanin Cl) at an amount to provide 4% solids by weight.

Example 6

Cobalt(III) Acetyl Acetonate (CoA) Data

The liquid electrophotographic ink of Example 1, the reference ink of Example 2, and the liquid electrophotographic ink of Example 3 were printed and measured in the following manner: the cyan ink dispersions (according to the specifications listed in the examples) were charged in the lab to low field conductivity (LFC) at 70 pmho/cm and were brought to a LFC of 85 pmho/cm, the Cyan set point conductivity on press. After calibrating the density meter and setting the conductivity, a color adjust was done in order to write the down the developing voltage. Additionally, the optical density was verified to be in the specification window. In order to gain efficiency in each test, a reference sample was run parallel to another 3 experimental samples. The test was run in a stress mode where the printing coverage was 0.1% for 1000 impressions. A color adjust was performed, with the developing voltage, optical density, conductivity and other press parameters recorded. This cycle was repeated again with another 1000 impressions with a check of the press parameters. The testing generally lasted for 10-12 k impressions in order to obtain severe increase in DRV for the reference Cyan sample, close to window edge, in order to compare it to experimental samples. The analysis done to data calculates the delta in optical density from start point as function of the printing impressions for all the tested samples.

The following results, summarized in Table 2, were obtained:

TABLE 2

| Kimp (Impressions in thousands) | Reference LEP ink from Example 2 | LEP ink (4% CoA) from Example 1 | LEP ink (1% CoA) from Example 3 |
|---|---|---|---|
| 0 | 1.3826 | 1.477 | 1.3924 |
| 1 | 1.3502 | 1.4206 | 1.3846 |
| 2 | 1.3258 | 1.4298 | 1.3424 |
| 3 | 1.2916 | 1.4164 | 1.304 |
| 4 | 1.306 | 1.4268 | 1.2852 |
| 5 | 1.2588 | 1.4206 | 1.2658 |
| 6 | 1.2512 | 1.4382 | 1.2684 |
| 7 | 1.2456 | 1.4432 | 1.2594 |
| 8 | 1.2204 | 1.4392 | 1.2396 |
| 9 | 1.2442 | 1.4414 | 1.2488 |
| 10 | 1.2164 | 1.4664 | 1.2352 |
| d(OD) after 10K impressions | −0.1662 | −0.0106 | −0.1572 |
| Initial DRV | 475 | 323 | 491 |

TABLE 2-continued

| Kimp (Impressions in thousands) | Reference LEP ink from Example 2 | LEP ink (4% CoA) from Example 1 | LEP ink (1% CoA) from Example 3 |
|---|---|---|---|
| DRV after 10K impressions | 588 | 323 | 600 |
| d(DRV) | 113 | 0 | 109 |

As can be seen in Table 2, the major improvement in optical density decline while running in stress mode was obtained for cobalt(III) acetyl acetonate (CoA) that was added at the amount of 4% by weight of cyan ink solids. The test was run at 0.1% coverage on Indigo series II press and contained a Cyan working dispersion (Reference LEP ink from Example 2) that served as reference where in parallel position the 4% solid by weight CoA was running for a comparison. The test was adiabatic, meaning that the ink was circulated between ink tank and the developing part (BID) while it is disengaged from the other parts of the press as PIP, imaging oil reservoir, charge director reservoir, ink can, etc. As such, the ink dispersion was exposed to a high electric field in a high frequency; i.e., a "stress mode" of operation. When testing was stopped to check the DRV and optical density, an engagement process (PIP, blanket etc.) was done.

Additionally, the results unexpectedly show that not just any amount of charge stabilizer can provide the results presently achieved; i.e., 1% solids by weight CoA did not provide the effect achieved when 4% solids by weight CoA was used. Without being bound by any particular theory, it is believed that at 1% solids by weight the CoA was not present in a sufficient amount to interact with the pigments to remove the excess charge.

Example 7

Comparative Charge Stabilizer Data

The liquid electrophotographic inks of Examples 4 and 5 were also studied in the manner indicated in Example 6. The following results, summarized in Table 3, were obtained:

TABLE 3

| Kimp (Impressions in thousands) | Reference LEP ink from Example 2 | LEP ink from Example 4 (Ag Benzoate) | LEP ink from Example 5 (Fe(III) phthalocyanin Cl) |
|---|---|---|---|
| 0 | 1.4802 | 1.4698 | 1.5106 |
| 1 | 1.3882 | 1.4252 | 1.4706 |
| 2 | 1.3168 | 1.397 | 1.4464 |
| 3 | 1.2544 | 1.3766 | 1.4224 |
| 4 | 1.2244 | 1.3706 | 1.403 |
| 5 | 1.2132 | 1.3692 | 1.392 |
| 6 | 1.1888 | 1.3724 | 1.3816 |
| 7 | 1.1604 | 1.3892 | 1.3784 |
| 8 | 1.1394 | 1.3974 | 1.3598 |
| 9 | 1.1416 | 1.3904 | 1.366 |
| 10 | 1.125 | 1.3862 | 1.3414 |
| d(OD) after 10K impressions | −0.3552 | −0.0836 | −0.1692 |
| Initial DRV | 350 | 362 | 349 |
| DRV after 10K impressions | 394 | 430 | 434 |
| d(DRV) | 44 | 68 | 85 |

As can be seen in Table 3, major improvement in optical density decline while running in stress mode was obtained for silver benzoate and iron(III) phthalocyanin chloride, both of which were added at an amount of 4% by weight of the cyan ink solids.

While the disclosure has been described with reference to certain examples, those skilled in the art will appreciate that various modifications, changes, omissions, and substitutions can be made without departing from the spirit of the disclosure. It is intended, therefore, that the invention be limited only by the scope of the following claims.

What is claimed is:

1. A liquid electrophotographic ink, comprising
   a carrier liquid;
   a resin;
   a pigment;
   a charge director; and
   a charge stabilizer having a reduction potential of 0.16 v to 3.0 v.

2. The liquid electrophotographic ink of claim 1, wherein the charge stabilizer is present at a concentration which stabilizes the liquid electrophotographic ink during continuous printing by removing excess charge from the pigment.

3. The liquid electrophotographic ink of claim 1, wherein pigment is a cyan pigment and the charge director is a negative charge director.

4. The liquid electrophotographic ink of claim 1, wherein the charge stabilizer is a metal salt or metal complex.

5. The liquid electrophotographic ink of claim 1, wherein the charge stabilizer is selected from the group of cobalt(III) acetyl acetonate, iron(III) phthalocyanin chloride, silver benzoate, hexamine cobalt(III) chloride, tris(ethylene diamine) cobalt(III) nitrate, praseodymium(III,IV)oxide, iron(III)ferrocyanide, terbium(III) acetate, pentaamine cobalt(III) chloride, and mixtures thereof.

6. The liquid electrophotographic ink of claim 1, wherein the charge stabilizer is cobalt(III) acetyl acetonate.

7. The liquid electrophotographic ink of claim 1, wherein the charge stabilizer maintains an optical density of the liquid electrophotographic ink, the optical density measured at a first impression and after a $10,000^{th}$ impression where the optical density after the $10,000^{th}$ impression is within at least 70% of the first impression, where the first and $10,000^{th}$ impressions are printed at 40% coverage over a print media sheet.

8. The liquid electrophotographic ink of claim 1, wherein the charge stabilizer maintains an optical density of the liquid electrophotographic ink, the optical density measured at a first impression and after a $10,000^{th}$ impression where the optical density after the $10,000^{th}$ impression is within at least 90% of the first impression, where the first and $10,000^{th}$ impressions are printed at 40% coverage over a print media sheet.

9. The liquid electrophotographic ink of claim 1, wherein the charge stabilizer is present in the ink in a charge stabilizer to pigment ratio of 1:3 to 1:8 by weight.

10. A method of maintaining optical density of a liquid electrophotographic ink after 10,000 impressions, comprising adding a charge stabilizer to a liquid electrophotographic ink, the liquid electrophotographic comprising:
   a carrier liquid;
   a resin;
   a cyan pigment; and
   a charge director,
   wherein the charge stabilizer is present at a concentration that maintains the optical density of the liquid electrophotographic ink, the optical density measured at a first impression and after a $10,000^{th}$ impression where the optical density after the $10,000^{th}$ impression is within at least 70% of the first impression, where the first and $10,000^{th}$ impressions are printed at 40% coverage over a print media sheet.

11. The method of claim 10, wherein the optical density is within at least 90% of the first impression.

12. The method of claim 10, wherein the charge stabilizer is cobalt(III) acetyl acetonate.

13. A method of manufacturing a liquid electrophotographic ink, comprising grinding a liquid carrier, a cyan pigment, a resin, a charge director, and a charge stabilizer to form the liquid electrophotographic ink, wherein the charge stabilizer stabilizes the liquid electrophotographic ink during continuous printing by removing excess charge from the cyan pigment.

14. The method of claim 13, wherein the charge director is a negative charge director.

15. The method of claim 13, wherein the charge stabilizer maintains an optical density of the liquid electrophotographic ink, the optical density measured at a first impression and after a $10,000^{th}$ impression where the optical density after the $10,000^{th}$ impression is within at least 70% of the first impression, where the first and $10,000^{th}$ impressions are printed at 40% coverage over a print media sheet.

* * * * *